(12) United States Patent
Fujimoto et al.

(10) Patent No.: US 6,684,156 B2
(45) Date of Patent: Jan. 27, 2004

(54) CHARGING AREA DISPLAY APPARATUS FOR VEHICLE AND CHARGING AREA DISPLAY METHOD FOR VEHICLE

(75) Inventors: Hiroshi Fujimoto, Zama (JP); Yuichiro Kawamoto, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/201,273

(22) Filed: Jul. 24, 2002

(65) Prior Publication Data

US 2003/0023376 A1 Jan. 30, 2003

(30) Foreign Application Priority Data

Jul. 24, 2001 (JP) .................................... 2001-223165

(51) Int. Cl.[7] ................................................. G06F 7/00
(52) U.S. Cl. ................................. 701/212; 340/995.15
(58) Field of Search .............................. 701/212, 211, 701/207, 208; 340/988, 995.1, 995.14, 995.15

(56) References Cited

FOREIGN PATENT DOCUMENTS

| JP | 2000-113256 A | | 4/2000 | |
| JP | 2000-113258 A | | 4/2000 | |
| JP | 2003035546 A | * | 2/2003 | ........... G01C/21/00 |

OTHER PUBLICATIONS

2003/0135427 –Murakami –Jul. 17, 2003–vehicle sales method, sever device and area information displaying and charging system for a car.*
2002/0049630–Furuta et al –Apr. 25, 2002–charging system.*

* cited by examiner

Primary Examiner—William A. Cuchlinski, Jr.
Assistant Examiner—Olga Hernandez
(74) Attorney, Agent, or Firm—Foley & Lardner

(57) ABSTRACT

A charging area display apparatus for vehicle comprises a storage device that stores in memory roadmap data and charging area data, a current position detection device that detects a current position of a vehicle, a display device that displays a roadmap, an approach judging device that judges whether or not the vehicle is approaching a charging area based upon the current vehicle position and the charging area data and a scaling factor change device that changes the scaling factor of the roadmap displayed on the display device so as to contain both the current vehicle position and the entirety of the charging area which the vehicle is approaching within the display screen when the vehicle is judged to be approaching the charging area. In this vehicle charging area display apparatus, the display device displays the current vehicle position and the charging area which the vehicle is approaching on the roadmap, the scaling factor of which has been changed as the vehicle approaches the charging area.

15 Claims, 10 Drawing Sheets

↑ AUTOMATIC SCALING FACTOR CHANGE

↓ AUTOMATICALLY RESET TO ORIGINAL SCALING FACTOR AFTER PREDETERMINED LENGTH OF TIME

FIG.6

```
    CHARGING AREA APPROACH
         PROCESSING

S21 ~ S24 IN FIG. 4

S31    SEARCH PARKING LOTS
       NEAR CURRENT POSITION

S32    SELECT AND DISPLAY PARKING LOTS
           OUTSIDE CHARGING AREA

S25 ~ S29 IN FIG. 4

RETURN
```

US 6,684,156 B2

CHARGING AREA DISPLAY APPARATUS FOR VEHICLE AND CHARGING AREA DISPLAY METHOD FOR VEHICLE

BACKGROUND OF THE INVENTION

1. Field of the Invention

The present invention relates to an apparatus that displays information related to a charging area.

2. Description of the Related Art

There are charging area display apparatuses for vehicle in the known art that display a charging area on a roadmap by utilizing a navigation system and notify the driver of the presence of the charging area (see Japanese Laid Open Patent Publication No. 2000-113258).

SUMMARY OF THE INVENTION

However, in such a charging area display apparatus for vehicle in the related art described above, a charging area contained in the roadmap around the current vehicle position displayed by utilizing the navigation system is displayed without changing the scaling factor of the roadmap. As a result, a problem arises in that when a detailed map is on display or the charging area ranges over a large area, the whole charging area cannot be shown on the roadmap around the current vehicle position, making it difficult to determine a route which may be taken to avoid entry to the charging area.

An object of the present invention is to display the relationship between the current vehicle position and the entirety of a charging area as the vehicle approaches the charging area to make it possible to easily determine a route which may be taken to avoid entry to the charging area.

The charging area display apparatus for vehicle according to the present invention comprises a storage device that stores in memory roadmap data and charging area data, a current position detection device that detects a current position of a vehicle, a display device that displays a roadmap, an approach decision-making device that decides that the vehicle is approaching a charging area based upon the current vehicle position detected by the current position detection device and the charging area data and a scaling factor change device that changes the scaling factor of the roadmap displayed on the display device so as to allow both the current vehicle position and the entirety of the charging area which the vehicle is approaching to be contained within the display screen when the vehicle is determined to be approaching the charging area. In this charging area display apparatus for vehicle, the display device displays the current vehicle position and the charging area which the vehicle is approaching on the roadmap, the scaling factor of which has been changed by the scaling factor change device.

In the charging area display method for vehicle according to the present invention, the current vehicle position is detected, the vehicle is determined to be approaching a charging area based upon the current vehicle position having been detected and charging area data, the scaling factor of a roadmap displayed on a display device is changed to a scaling factor that allows the current vehicle position and the entirety of the charging area which the vehicle is approaching to be contained in the display screen if the vehicle is determined to be approaching the charging area and the current vehicle position and the charging area which the vehicle is approaching are displayed on the roadmap displayed at the scaling factor having been changed as the vehicle approaches the charging area.

BRIEF DESCRIPTION OF THE DRAWINGS

FIG. 6 presents a flowchart of the charging area approach processing implemented in a second embodiment;

DETAILED DESCRIPTION OF THE PREFERRED EMBODIMENTS

First Embodiment

Figure 1:
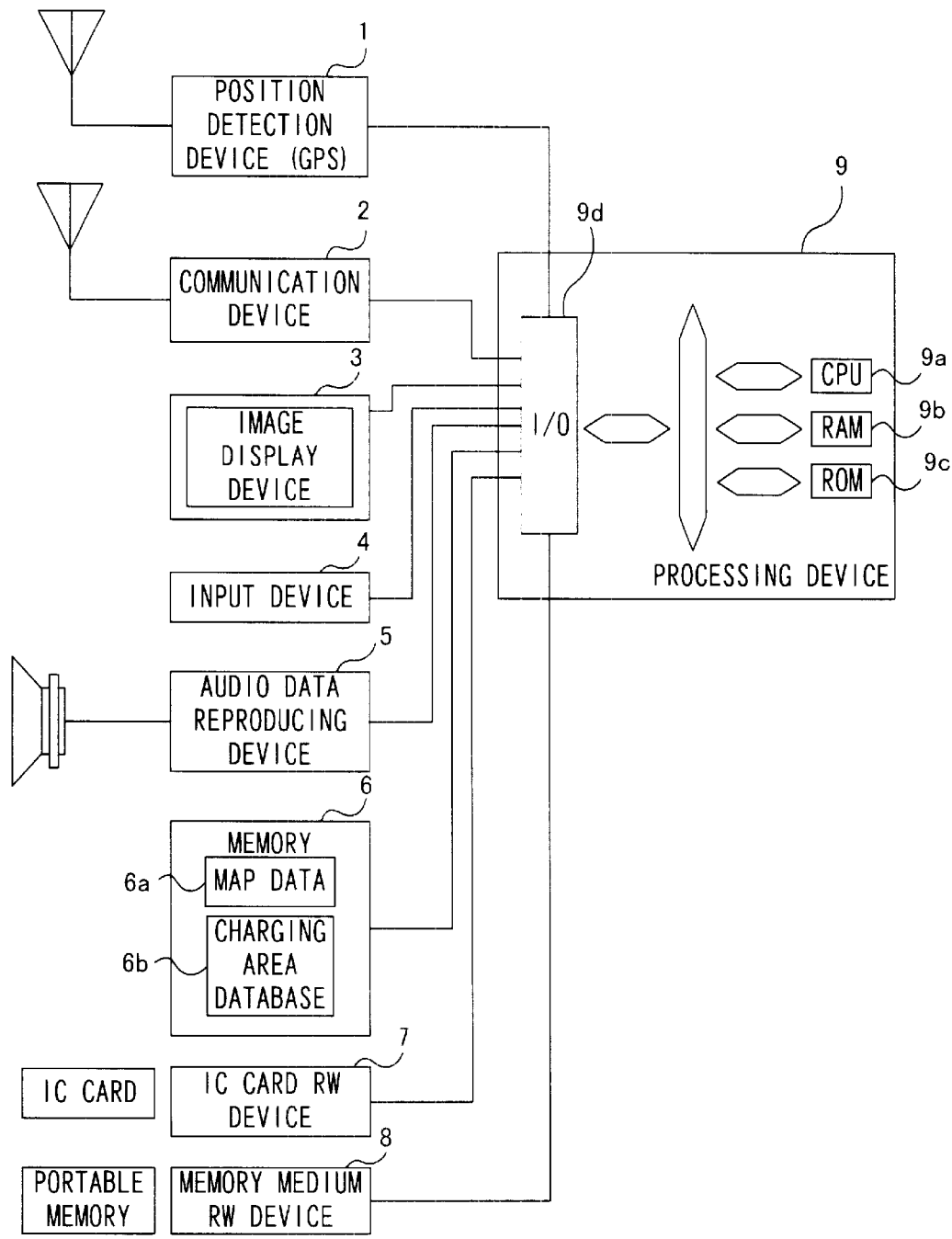
FIG. 1 shows the structure adopted in the charging area display apparatus for vehicle in a first embodiment.

FIG. 1 shows the structure adopted in the charging area display apparatus for vehicle in the first embodiment. A position detection device 1 which includes a GPS receiver detects the current position of the vehicle through satellite navigation. It is to be noted that the position detection device 1 may include a vehicle distance decoder and a vehicle advancing direction finder, instead. In such a case, the current vehicle position may be detected with gyro sensor by drawing the locus of the traveling vehicle based upon the detected traveling distance and advancing direction and then matching the traveling locus with a roadmap stored in a map database.

A communication device 2 engages in communication with a road traffic information center or the like through radio waves or light beacons, via roadside equipment of a nonstop automated toll collection system (Electronic Toll Collection System) or via a portable telephone and receives various types of information including information related to charging areas. An image display device 3 displays a roadmap and also displays the current vehicle position and the charging area on the roadmap. The driver inputs various types of parameters such as a roadmap display scaling factor and various types of data through an input device 4. An audio data reproducing device 5 generates voice advisories with various types of information including information notifying that the vehicle is approaching a charging area.

A memory 6 includes a map database 6a in which roadmap data are stored and a charging area database 6b in which data related to charging areas are stored. The charging area data include longitude/latitude data that are used to identify charging areas and toll charge data. An IC card RW device 7 reads and writes toll processing data stored in an IC card. A memory medium RW device 8 reads various types of data such as the results of the toll processing into a portable memory medium which may be a memory card and reads various control parameters, updated data on a charging area and the like from the portable memory medium.

A processing device 9 includes a CPU 9a, a RAM 9b, a ROM 9c and an I/O 9d. The processing device 9 decides as to whether or not a charging area is present within a predetermined area which contains the current vehicle position, verifies the size of the charging area present within the predetermined area and determines a map scaling factor at which the current vehicle position and the entire charging area can be displayed, by executing the control program to be detailed later. It is to be noted that the decision as to whether or not a charging area is present within the predetermined area which contains the current vehicle position may be made by, for instance, measuring the distance to the charging area both along the vehicle advancing direction and the lateral direction extending almost perpendicular to the advancing direction and then comparing the distances with the distance from the current position to the periphery of the predetermined area.

If it is decided that a charging area is present in the predetermined area containing the current vehicle position, a roadmap scaled at a factor which allows the current vehicle position and the entire charging area to be displayed is displayed at the image display device 3 and the driver is informed that the vehicle is approaching a charging area through the audio data reproducing device 5. Thus, the driver can be warned that the vehicle is approaching the charging area with a high degree of reliability and is easily able to determine a route he can take to enter the charging area or a route he can take to detour around the charging area by accurately ascertaining the positional relationship between the vehicle and the charging area.

Figure 2:
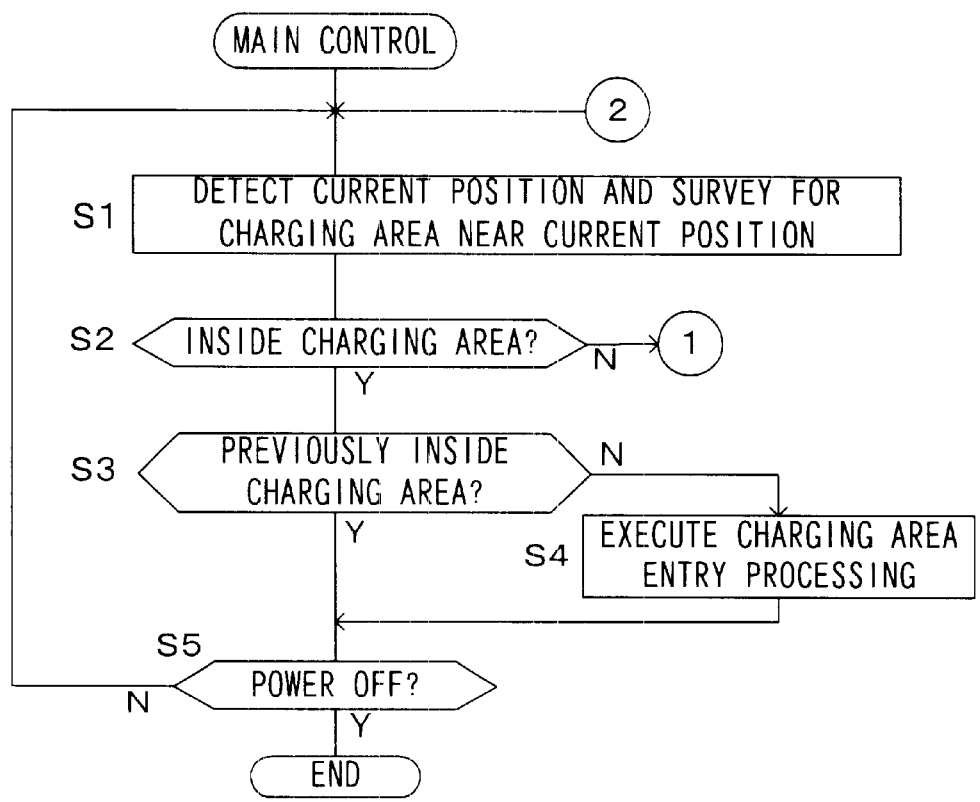
FIG. 2 presents a flowchart of the main control program executed in the first embodiment.
Figure 3:
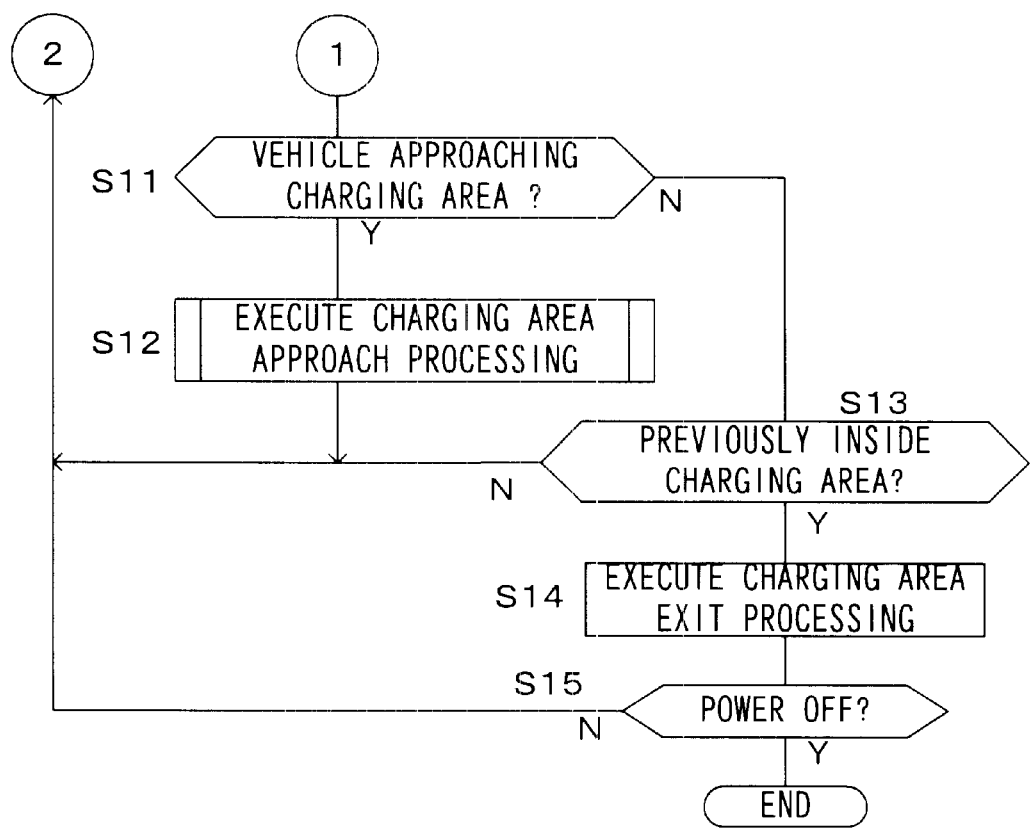
FIG. 3 presents a flowchart of the main control program executed in the first embodiment, in continuation from FIG. 2.

FIGS. 2 and 3 present a flowchart of the main control program executed to control the charging area display. Now, in reference to the flowchart, the operation achieved in the first embodiment is explained. The CPU 9a in the processing device 9 repeatedly executes this main control program while power to the charging area display apparatus for vehicle in the embodiment is on. In the following explanation, the phrase "the previous operation" means the previous execution of the program and the phrase "the current operation" means the current execution of the program.

In step S1, the current vehicle position is detected by the position detection device 1 and an area surrounding the current vehicle position is surveyed for the presence of any charging area based upon the roadmap data stored in the map database 6a and the charging area data stored in the charging area database 6b. The positional relationship between the current vehicle position and a given charging area is stored in the RAM 9b each time the main control program is executed and a decision is made with regard to an entry to or an exit from the charging area based upon the current data and the data on past history.

In step S2, it is judged as to whether or not the current vehicle position is inside a charging area. The operation proceeds to step S3 if the current vehicle position is determined to be inside a charging area, whereas the operation proceeds to step S1 in FIG. 3 if the current vehicle position is outside a charging area. In step S3, it is judged as to whether or not the vehicle position detected during the previous execution of the program was also inside the charging area based upon the positional relationship between the previous vehicle position and the charging area stored in the RAM 9b. If it is judged that the vehicle was inside the charging area during the previous operation and also is currently inside the charging area, the operation proceeds to step S5. In step S5, it is judged as to whether or not the power has been turned off. If it is decided that the power has been turned off, the charging area display processing ends, whereas if it is judged that the power has not been turned off, the operation returns to step S1.

If, on the other hand, it is judged in step S3 that the vehicle position was not inside the charging area during the previous execution of the main control program but is inside the charging area during the current execution of the main control program, the operation proceeds to step S4. In step S4, based upon the decision that the vehicle has entered the charging area for the first time in the current operation, charging area entry processing such as processing for informing the driver that the vehicle has entered the charging area through the audio data reproducing device 5 is executed. At this time, a roadmap of the area around the current vehicle position is on display at the image display device 3, with the charging area and the current position mark indicating the current position of the vehicle having entered the area displayed on the roadmap. Once the charging area entry processing is completed, the operation proceeds to step S5.

If, on the other hand, the current vehicle position is not inside the charging area, it is judged in step S11 in FIG. 3 as to whether or not the vehicle is approaching the charging area. For instance, the judgement as to whether or not the vehicle is approaching the charging area is implemented by measuring the distance to the charging area both along the vehicle advancing direction and along the lateral direction extending almost perpendicular to the advancing direction and by comparing the measured distances with a predetermined approach judging reference distance. If either of the measured distances is equal to or less than the judging reference distance, it is judged that the vehicle is approaching the charging area and the operation proceeds to step S12. In step S12, charging area approach processing is implemented by executing the subroutine processing shown in FIG. 4. This charging area approach processing is to be detailed later. Once the charging area approach processing is completed, the operation returns to step S1 in FIG. 2 to repeat the processing described above.

If, on the other hand, the measured distances to the charging area both exceed the judging reference distance, it is judged that the vehicle is not approaching the charging area and the operation proceeds to step S13. In step S13, based upon the positional relationship between the vehicle position and the charging area detected during the previous execution of the main control program and stored in the RAM 9b, it is judged as to whether or not the vehicle was previously inside the charging area.

If the vehicle position was previously inside the charging area and the current vehicle position is not inside the charging area, it is judged that the vehicle has exited the charging area and the operation proceeds to step S14. In step S14, charging area exit processing is executed by, for instance, informing the driver that the vehicle has exited the charging area through the audio data reproducing device 5. At this time, a roadmap of the area around the current vehicle position is on display at the image display device 3. The charging area and the current position mark indicating the current position of the vehicle having exited the area are shown on the roadmap.

As the charging area exit processing in step S14 is completed, the operation proceeds to step S15. In step S15, it is judged as to whether or not the power has been turned off. If it is judged that the power has been turned off, the charging area display processing ends, whereas the operation returns to step S1 otherwise. In addition, if it is judged in step S13 that the vehicle position was not previously inside the charging area, the operation returns to step S1 in FIG. 2 as well.

Figure 4:
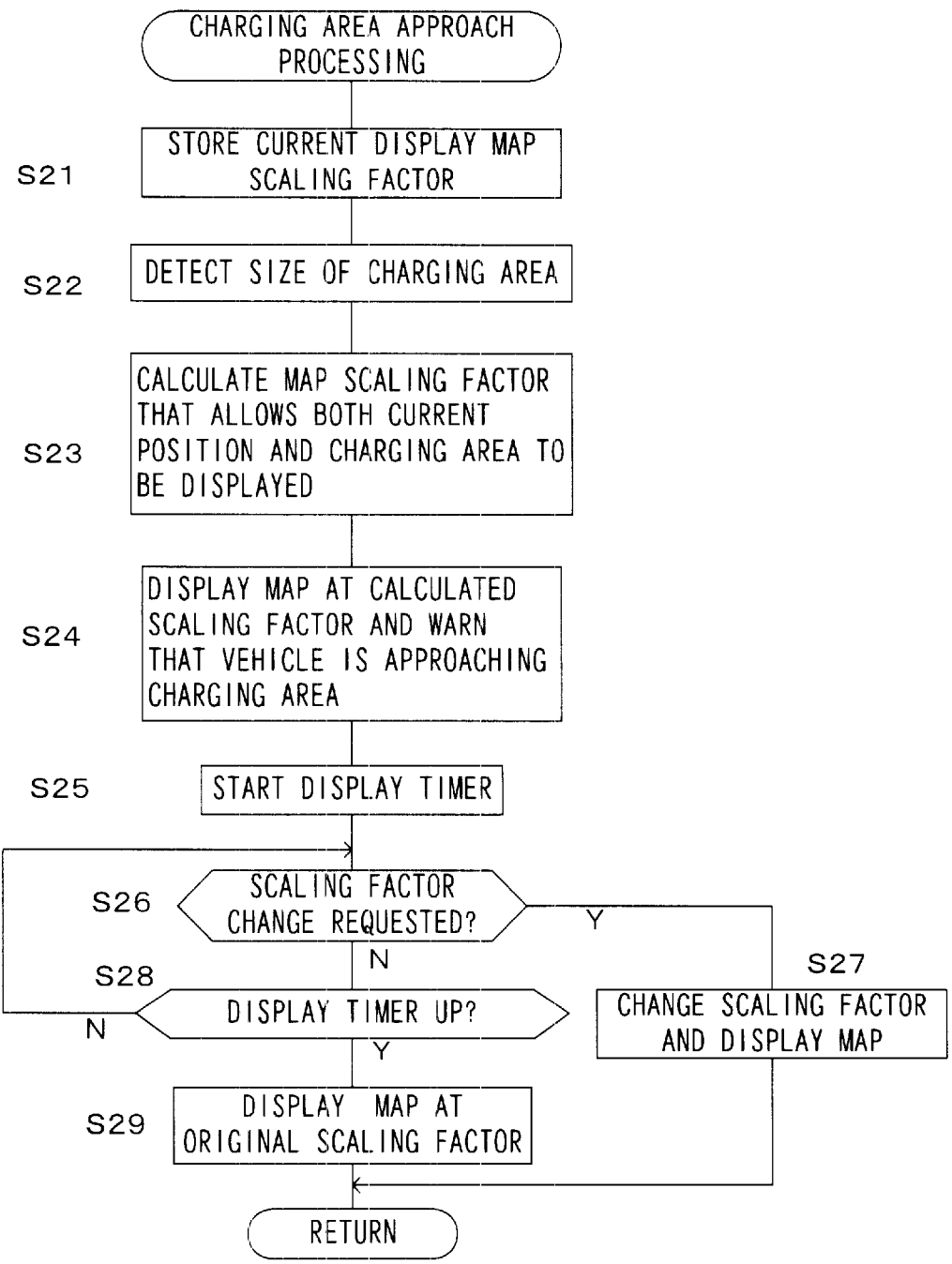
FIG. 4 presents a flowchart of the charging area approach processing implemented in the first embodiment.

Next, the charging area approach processing executed in the first embodiment by performing the subroutine processing shown in FIG. 4 is explained. In step S21, the scaling factor of the map currently on display at the image display device 3 is stored in the RAM 9b. FIG. 5A presents an example of map display on the image display device 3. In this display example, the vehicle indicated by a current position mark 10 is approaching a charging area 100 with the distance OX (m) to the charging area 100 and the toll Δ○ applicable in the charging area 100 displayed at the top of the screen.

In the following step S22, the size of the charging area which the vehicle is approaching is detected based upon the charging area data stored in the charging area database 6b. Once the size of the charging area is detected, the operation proceeds to step S23.

In step S23, a map scaling factor that allows both the current vehicle position and the entirety of the charging area which the vehicle is approaching to be displayed in the display screen of the image display device 3 is calculated. Once the map scaling factor is calculated, the operation proceeds to step S24. In step S24, a map is generated at the scaling factor calculated in step S23 based upon the map data stored in the map database 6a and is brought up on display at the image display device 3. At the same time, the driver is informed that the vehicle is approaching the charging area through the audio data reproducing device 5.

Figure 5B:
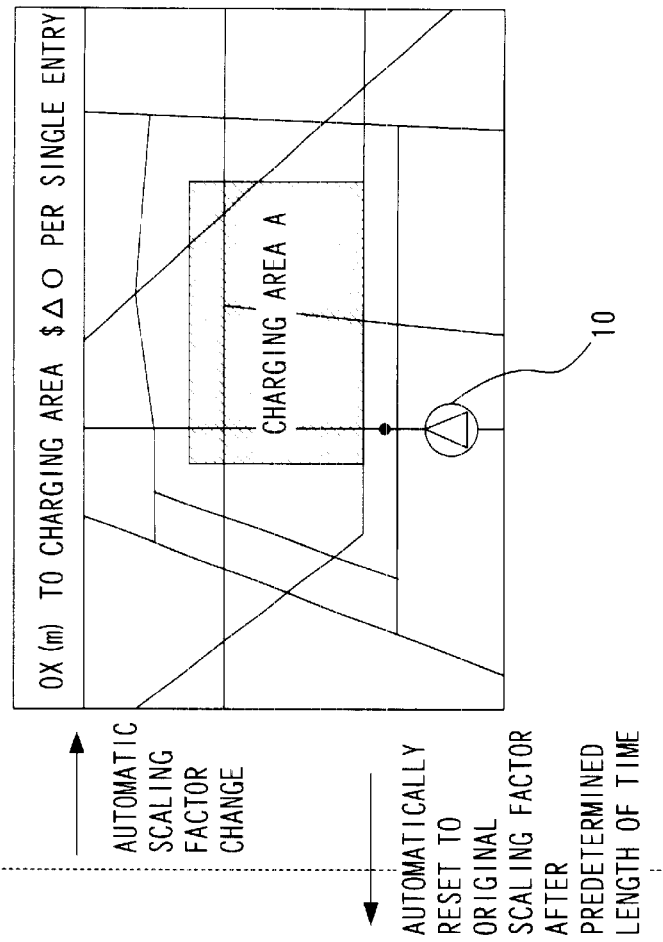
FIG. 5A shows an example of map display prior to a scaling factor change and FIG. 5B shows an example of map display after a scaling factor change.
Figure 5A:
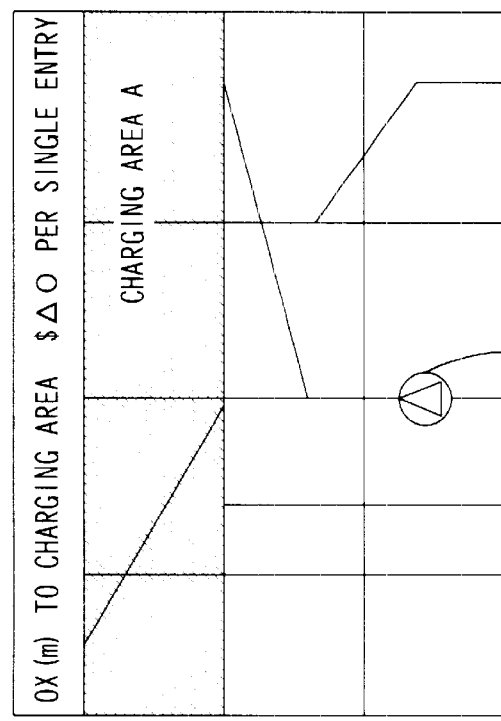

FIG. 5B presents an example of map display at the scaling factor calculated in step S23. In this display example, the vehicle indicated by the current position mark 10 and the entirety of the charging area 100 which the vehicle is approaching are displayed in the display screen of the image display device 3. It is to be noted that the map shown in FIG. 5B remains on display over a predetermined length of time as described later and the map at the original scaling factor shown in FIG. 5A is brought back on display when the predetermined length of time has elapsed.

In step S25 which follows step S24, a display timer at which the display time is set in advance is started. Once the displayed timer is started, the operation proceeds to step S26. In step S26, it is judged as to whether or not the driver has requested a change in the display map scaling factor. If the driver has performed an operation for changing the display map scaling factor through the input device 4, the operation proceeds to step S27, whereas the operation proceeds to step S28 if a scaling factor change operation has not been performed.

In step S27, a map is displayed at the scaling factor specified through the change operation at the image display device 3. In step S28, on the other hand, it is judged as to whether or not a time-up has occurred at the display timer started in step S25. If it is judged that a time-up has not occurred at the display timer, the operation returns to step S26 to repeat the processing described above. If it is decided that a time-up has occurred at the display timer to indicate that the predetermined length of display time has elapsed, however, the operation proceeds to step S29. In step S29, the map at the original scaling factor (see FIG. 5A) stored in the RAM 9b is brought up on display at the image display device 3. Then, the operation returns to execute the main control program shown in FIG. 3.

As described above, if the vehicle is detected to be approaching a charging area, the driver is informed of the approach through a voice message, a map scaling factor which allows both the current vehicle position and the entire charging area that the vehicle is approaching to be displayed in the display screen of the image display device 3 is calculated and a map is displayed at the scaling factor thus calculated. As a result, the driver can be warned that the vehicle is approaching a charging area with a high degree of reliability and is able to easily determine a route to take to enter the charging area or a route to take to avoid entering the charging area by accurately ascertaining the positional relationship between the vehicle and the entire charging area. In addition, the driver is able to easily determine whether he should make a right turn or a left turn to avoid entering the charging area.

Since the map scaling factor is automatically changed as the vehicle approaches the charging area, the driver can focus on driving the vehicle without having to manually change the map scaling factor. In addition, the roadmap display is reset to the original scaling factor after the roadmap is displayed over the predetermined length of time at the scaling factor calculated as the vehicle approaches the charging area. As a result, since the roadmap display is automatically reset to the original scaling factor to show a more readable roadmap without requiring the driver to perform a scaling factor change operation after the driver ascertains the positional relationship between the vehicle and the entire charging area and determines a route to take to enter or avoid entering the charging area, the driver can easily enter or avoid entering the charging area while checking the map displayed at the original scaling factor.

Second Embodiment

The second embodiment, which provides guidance for the vehicle to a parking lot outside a charging area when the destination is inside the charging area, is now explained. It is to be noted that since the structure adopted in the charging area display apparatus for vehicle in the second embodiment is similar to that shown in FIG. 1, its illustration and explanation are omitted. In addition, since the main control program executed in the second embodiment is similar to the program shown in FIGS. 2 and 3, its illustration and explanation are omitted as well.

FIG. 6 presents a flowchart of the charging area approach processing implemented in the second embodiment. It is to be noted that the explanation focuses on the difference from the processing shown in FIG. 4 with the same step numbers assigned to steps in which processing similar to that in FIG. 4 is implemented. Once a map is displayed on the image display device 3 at a scaling factor that allows the current vehicle position and the entirety of the charging area which the vehicle is approaching to be contained in the display through the processing in steps S21~S24 in FIG. 4, the operation proceeds to step S31. In step S31, parking lots near the current position are searched based upon parking lot data stored in the map database 6a. When the search of the parking lots near the current position is completed, the operation proceeds to step S32.

Figure 7:
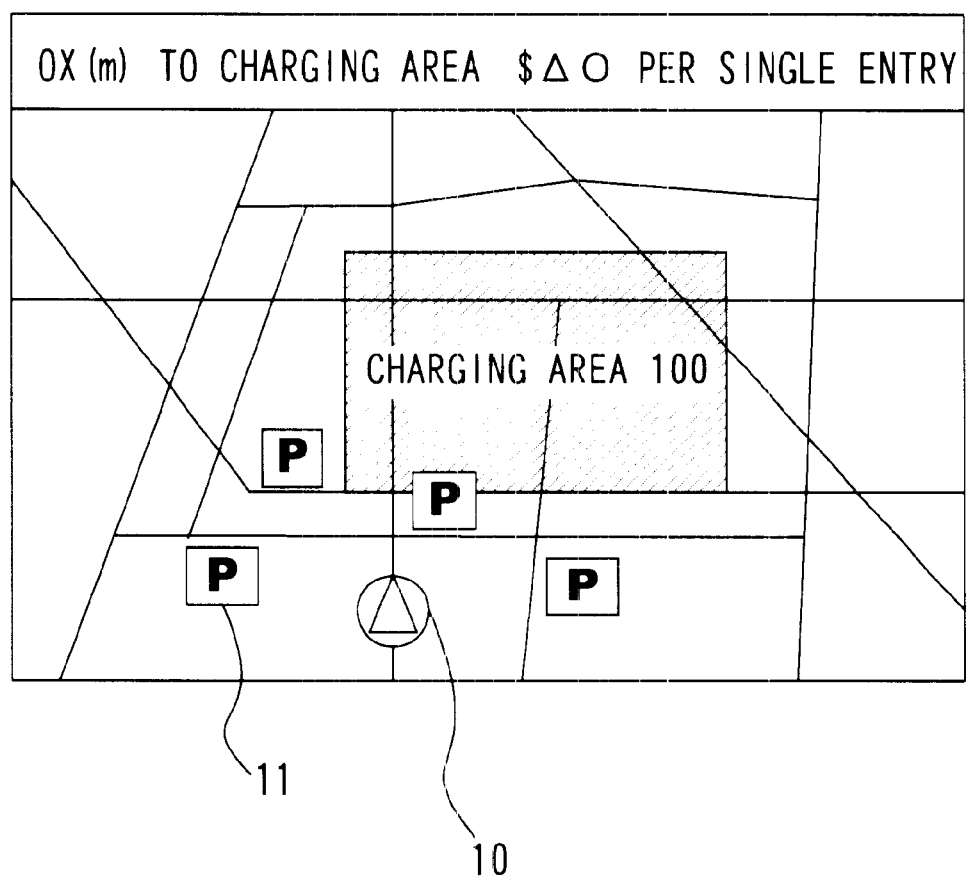
FIG. 7 shows an example of map display achieved in the second embodiment.

In step S32, a parking lot which is located outside the charging area is selected from the parking lots that have been searched around the current vehicle position and a parking lot mark is displayed on the map currently on display at the image display device 3. If there are a plurality of parking lots located outside the charging area, all of them are indicated by parking lot marks. FIG. 7 presents an example of map display in which parking lots located outside the charging area are indicated. In this display example, the current position mark 10 indicating the current position of the vehicle and parking lot marks (P marks) 11 indicating the positions of parking lots located outside the charging area 100 are displayed on the map at a scaling factor that allows the current vehicle position and the entirety of the charging area 100 which the vehicle is approaching to be contained in the display. After the parking lots located outside the charging area are brought up on display, the processing in steps S25~S29 in FIG. 4 is executed before the operation returns to the main control program shown in FIG. 3.

In the second embodiment, a parking lot located near the current vehicle position but outside the charging area is brought up on display when the vehicle is detected to be approaching the charging area. Thus, it allows the driver to head for the parking lot outside the charging area displayed on the map in a trouble-free manner without having to engage in a complicated parking lot search operation when the driver's destination is inside the charging area but the driver does not wish to enter the charging area and pay the toll, in addition to achieving the advantages of the first embodiment. This makes traffic around the charging area smooth.

It is to be noted that by displaying detailed information such as the availability of parking space and the parking fee at each parking lot in addition to the parking lots displayed in the second embodiment, the driver is able to select the best parking lot. Such detailed information on parking lots can be obtained by a means such as radio waves beacon, light beacon, charging area warning beacons, FM multiplex broadcasting or communication with a road traffic information center via a portable telephone.

In addition, while an explanation is given in reference to the second embodiment on an example in which parking lots located near the current vehicle position but outside the charging area that the vehicle is approaching are searched and brought up on display, the type of facilities to be searched is not limited to parking lots and another preselected type of facilities such as restaurants or hotels may be searched and brought up on display. Furthermore, a plurality of types of facilities may be searched and the driver may be allowed to make a display selection.

Third Embodiment

The third embodiment, which provides guidance to the driver on a route that allows the vehicle to detour around a charging area is now explained. It is to be noted that since the structure adopted in the charging area display apparatus for vehicle in the third embodiment is similar to that shown in FIG. 1, its illustration and explanation are omitted. In addition, since the main control program executed in the third embodiment is similar to the program shown in FIGS. 2 and 3, its illustration and explanation are omitted as well.

Figure 8:
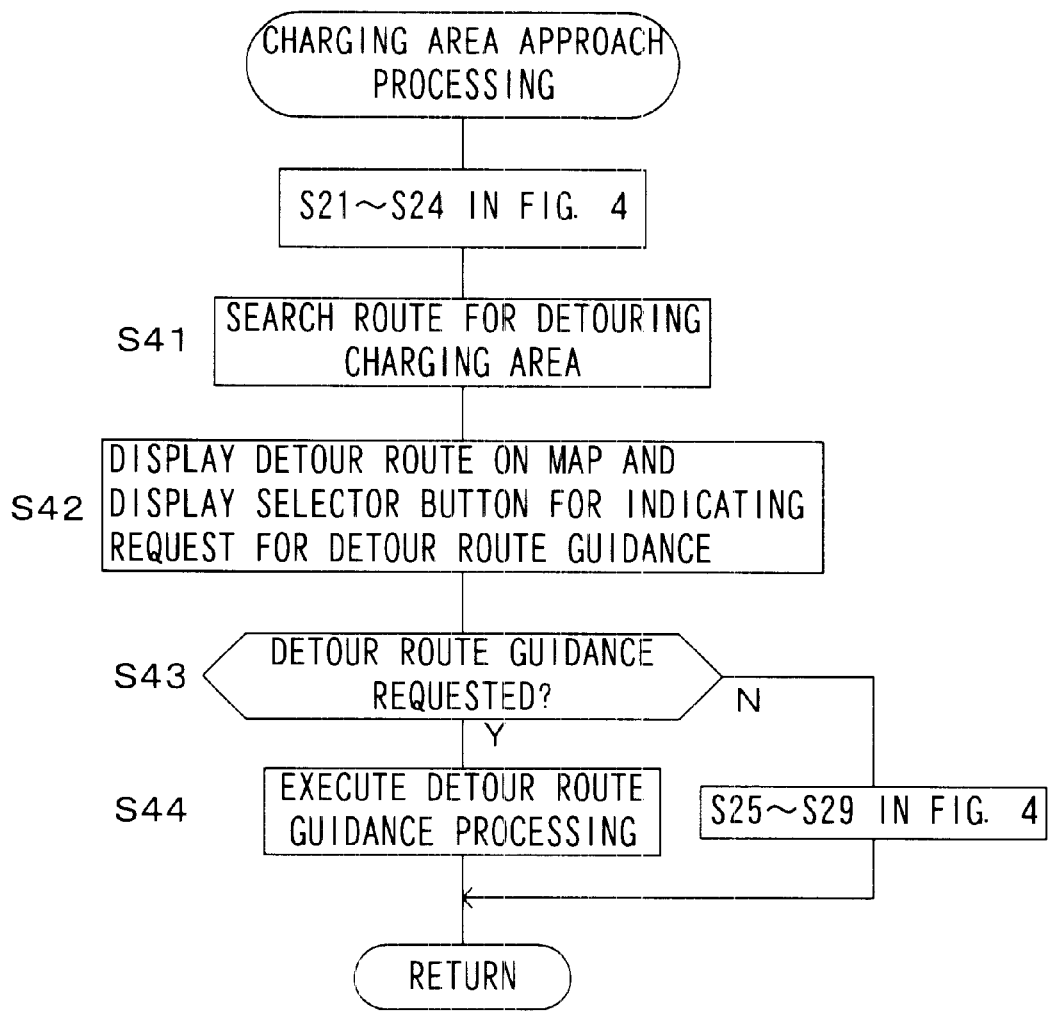
FIG. 8 presents a flowchart of the charging area approach processing implemented in a third embodiment.

FIG. 8 presents a flowchart of the charging area approach processing implemented in the third embodiment. It is to be noted that the explanation focuses on the difference from the processing shown in FIG. 4 with the same step numbers assigned to steps in which processing similar to that in FIG. 4 is implemented. Once a map is displayed on the image display device 3 at a scaling factor that allows the current vehicle position and the entirety of the charging area which the vehicle is approaching to be contained in the display through the processing in steps S21~S24 in FIG. 4, the operation proceeds to step S41. In step S41, a detour route that allows the vehicle to detour around the charging area which the vehicle is approaching by maintaining a distance equal to or larger than a predetermined distance is searched.

In the following step S42, the detour route obtained through the search is displayed on the map at the scaling factor that allows both the current vehicle position and the entirety of the charging area which the vehicle is approaching to be contained in the display and a selector button which allows the driver to select whether or not he needs detour route guidance is brought up on display.

Figure 9:
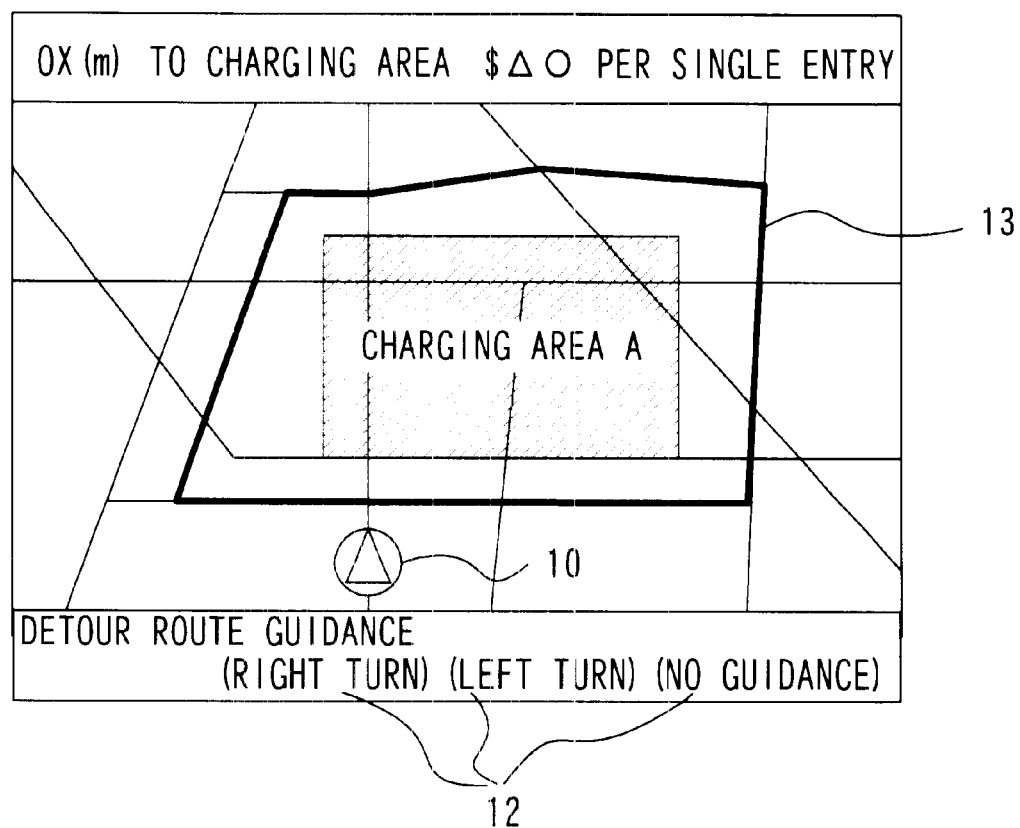
FIG. 9 shows an example of map display achieved in the third embodiment.

FIG. 9 presents an example of display in which a detour route is shown on the map containing the current vehicle position and the entirety of the charging area which the vehicle is approaching. In this display example, a detour route 13, which avoids the charging area 100 by maintaining a distance equal to or larger than a predetermined distance, is shown on a map containing the current position mark 10 indicating the current position of the vehicle and the entirety of the charging area 100 which the vehicle is approaching. The detour route 13 is constituted of roads each achieving an appropriate road width, where no traffic regulations such as one-way traffic are in effect. At the bottom of the screen, selector buttons 12 to be operated by the driver to indicate whether or not he needs detour route guidance are displayed. The selector buttons 12 include a "right turn" button which is operated to indicate that the driver requests detour guidance along the detour route to the right, a "left turn" button which is operated to indicate that the driver requests detour guidance along the detour route to the left and a "no guidance" button which is operated to indicate that the driver does not require any detour route guidance. These buttons each correspond to a display panel switch (not shown) at the input device 4.

In step S43, which follows step S42, it is judged as to whether or not the driver has requested detour route guidance. If it is judged that the driver has requested detour route guidance, the operation proceeds to step S44, whereas the processing in steps S25~S29 in FIG. 4 is executed if it is judged that the driver has not requested any detour route guidance. In step S44, guidance is provided through detour route display and through voice guidance, to guide the driver along the detour route 13 to the left or to the right as requested. Subsequently, the operation returns to execute the main control program shown in FIG. 3.

In the third embodiment, if the vehicle is detected to be approaching a charging area, a route that may be taken to detour around the charging area is searched and the detour route resulting from the search is displayed on the map containing the current vehicle position and the charging area being approached. As a result, it becomes possible to detour around the charging area in a trouble-free manner along the detour route without requiring the driver to engage in a detour route search operation. In addition, since a detour route that allows the vehicle to detour around the charging area which the vehicle is approaching by maintaining a distance equal to or larger than the predetermined distance is searched and displayed, it is ensured that the vehicle does not enter the charging area by mistake after inadvertently going off the detour route on display and thus, the vehicle is allowed to detour around the charging area with a high degree of reliability. Furthermore, as a detour route that can be taken to the right or to the left to avoid the charging area which the vehicle is approaching is searched and the driver is allowed to indicate that he requests detour guidance for a route either to the right or to the left, the driver is afforded free selection of a right turn or a left turn to detour around the charging area.

Fourth Embodiment

Charging areas include 24-hour charging areas and charging areas where tolls are charged only during specified hours. Now, the fourth embodiment in which the charging area display processing explained in reference to the first through third embodiments is executed only during the toll charging hours when the vehicle is approaching the latter type of charging area is explained. It is to be noted that since the structure adopted in the charging area display apparatus for vehicle in the fourth embodiment is similar to the structure shown in FIG. 1, its illustration and explanation are omitted.

Figure 10:
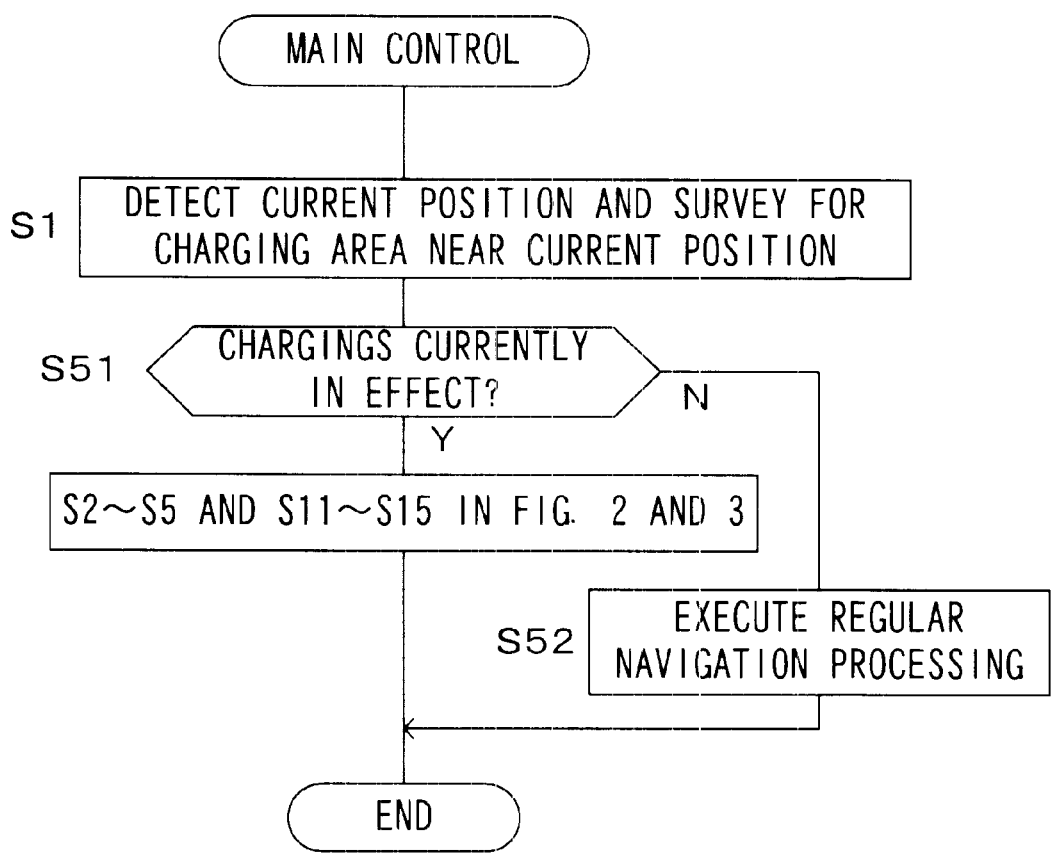
FIG. 10 presents a flowchart of the main control program executed in a fourth embodiment.

FIG. 10 presents a flowchart of the main control program executed in the fourth embodiment. It is to be noted that the explanation focuses on the difference from the processing shown in FIGS. 2 and 3 with the same step numbers assigned to steps in which processing similar to that in FIGS. 2 and 3 is implemented.

In step S1, the current vehicle position is detected and an area around the current vehicle position is surveyed for the presence of a charging area, as explained earlier. In step S51 which follows step S1, it is judged based upon the charging area data stored in the charging area database 6b as to whether or not tolls are currently being charged at the charging area near the current vehicle position. If it is judged that toll charges are in effect, the processing in steps S2~S5 in FIG. 2 and the processing in steps S11~S15 in FIG. 3 are executed. If, on the other hand, it is judged that tolls are not currently in effect, the charging area display processing described above is not executed and instead, regular navigation processing of the known art is implemented. It is to be noted that the current time may be obtained through an on-vehicle clock or it may be ascertained based upon a GPS signal.

In the fourth embodiment, in which any processing such as the charging area display, the display map scaling factor change, the approach warning, the search and display of charging area detour routes, the search and display of facilities located outside the charging area, e.g., parking lots and the like, is not implemented beyond the toll charging hours, the driver does not become confused by unnecessary warnings and unnecessary map display.

The above described embodiments are examples, and various modifications can be made without departing from the spirit and scope of the invention. For instance, while the roadmap data and the charging area data are recorded in advance in the memory 6, these data may be obtained from a road traffic information center or the like while the vehicle is running by utilizing a communication device. In addition, as the vehicle approaches a charging area, a map containing both the current vehicle position and the charging area that the vehicle is approaching may be obtained from a road traffic information center or the like.

The disclosure of the following priority application is herein incorporated by reference: Japanese Patent Application No. 2001-223165 filed Jul. 24, 2001

What is claimed is:

1. A charging area display apparatus for vehicle comprising:
   a storage device that stores in memory roadmap data and charging area data;
   a current position detection device that detects a current position of a vehicle;
   a display device that displays a roadmap;
   an approach judging device that judges whether or not the vehicle is approaching a charging area based upon the current vehicle position detected by the current position detection device and the charging area data; and
   a scaling factor change device that changes a scaling factor of the roadmap displayed on the display device so as to contain both the current vehicle position and the entirety of the charging area which the vehicle is approaching within a display screen when the vehicle is judged to be approaching the charging area, wherein:
   the display device displays the current vehicle position and the charging area which the vehicle is approaching on the roadmap, the scaling factor of which has been changed by the scaling factor change device.

2. A charging area display apparatus for vehicle according to claim 1, further comprising:
   a warning device that issues a voice warning that the vehicle is approaching the charging area when the vehicle is judged to be approaching the charging area.

3. A charging area display apparatus for vehicle according to claim 1, wherein:
   the display device returns to the original scaling factor set prior to changing the scaling factor after displaying the roadmap at the scaling factor selected by the scaling factor change device over a predetermined length of time.

4. A charging area display apparatus for vehicle according to claim 1, further comprising:
   a facility search device that searches a preselected type of facility located near the current vehicle position and outside the charging area which the vehicle is approaching based upon the roadmap data and the charging area data, wherein:
   the display device displays facilities searched by the facility search device on the roadmap on display at the scaling factor set by the scaling factor change device.

5. A charging area display apparatus for vehicle according to claim 4, wherein:
   the preselected type of facility is parking lots.

6. A charging area display apparatus for vehicle according to claim 4, wherein:
   a plurality of types of facilities can be preselected and the display device displays a type of facility indicated by an operator.

7. A charging area display apparatus for vehicle according to claim 1, further comprising:
   a detour route search device that searches a route to be taken to detour around a charging area which the vehicle is approaching when the vehicle is judged to be approaching the charging area, wherein:
   the display device displays the detour route having been searched by the detour route search device on the roadmap on display at the scaling factor set at the scaling factor change device.

8. A charging area display apparatus for vehicle according to claim 7, wherein:
   the detour route search device searches a detour route that maintains a distance equal to or larger than a predetermined distance from the charging area which the vehicle is approaching.

9. A charging area display apparatus for vehicle according to claim 7, wherein:
   the detour route search device searches detour routes to the right and to the left of the charging area which the vehicle is approaching; and
   a selection device is provided to select detour route guidance for a right run or a left turn.

10. A charging area display apparatus for vehicle according to claim 1, wherein:
    the scaling factor change device does not change the scaling factor of the map on display if toll charges are not currently in effect in the charging area.

11. A charging area display apparatus for vehicle according to claim 2, wherein:
the warning device does not issue an approach warning if toll charges are not currently in effect in the charging area.

12. A charging area display apparatus for vehicle according to claim 4, wherein:
the facility search device does not engaged in a facility search if toll charges are not currently in effect in the charging area.

13. A charging area display apparatus for vehicle according to claim 7, wherein:
the detour route search device does not engage in a detour route search if toll charges are not currently in effect in the charging area.

14. A charging area display apparatus for vehicle, comprising:
a storage means for storing in memory roadmap data and charging area data;
a current position detection means for detecting a current position of a vehicle;
a display means for displaying a roadmap;
an approach judging means for judges whether or not the vehicle is approaching a charging area based upon the current vehicle position detected by the current position detection means and the charging area data; and
a scaling factor change means for changing a scaling factor of the roadmap displayed on the display means so as to contain both the current vehicle position and the entirety of the charging area which the vehicle is approaching within a display screen when the vehicle is judged to be approaching the charging area, wherein:
the display means displays the current vehicle position and the charging area which the vehicle is approaching on the roadmap, the scaling factor of which has been changed by the scaling factor change means.

15. A charging area display method for vehicle, comprising:
detecting a current position of a vehicle;
judging whether or not the vehicle is approaching a charging area based upon the current vehicle position having been detected and charging area data; and
changing a scaling factor of a roadmap on display at a display device so as to contain the current vehicle position and the entirety of the charging area which the vehicle is approaching within a display screen of the display device if the vehicle is judged to be approaching the charging area, wherein:
the current vehicle position and the charging area which the vehicle is approaching are displayed at the display device on the roadmap at the scaling factor set as the vehicle approaches the charging area.

* * * * *